(12) United States Patent
Hu et al.

(10) Patent No.: US 11,787,567 B2
(45) Date of Patent: Oct. 17, 2023

(54) LOW-ORBIT SATELLITE DEORBIT CONTROL METHOD AND SYSTEM BASED ON PARTICLE SWARM ALGORITHM

(71) Applicant: Space Engineering University, Beijing (CN)

(72) Inventors: Min Hu, Beijing (CN); Jiuyang Li, Beijing (CN); Qiang Li, Beijing (CN); Xuyu Wang, Beijing (CN); Chaoming Yun, Beijing (CN); Xueyang Zhang, Beijing (CN); Tianyu Sun, Beijing (CN); Qinglei Song, Beijing (CN)

(73) Assignee: Space Engineering University, Beijing (CN)

( * ) Notice: Subject to any disclaimer, the term of this patent is extended or adjusted under 35 U.S.C. 154(b) by 321 days.

(21) Appl. No.: 17/363,363

(22) Filed: Jun. 30, 2021

(65) Prior Publication Data
US 2022/0002006 A1  Jan. 6, 2022

(30) Foreign Application Priority Data

Jul. 1, 2020 (CN) .......................... 202010629155.7

(51) Int. Cl.
*B64G 1/24* (2006.01)
*G06N 3/08* (2023.01)

(52) U.S. Cl.
CPC .............. *B64G 1/242* (2013.01); *B64G 1/247* (2023.08); *G06N 3/08* (2013.01)

(58) Field of Classification Search
CPC .... B64G 1/242; B64G 2001/247; B64G 1/26; B64G 1/62; G06N 3/08; G06N 3/006
See application file for complete search history.

(56) References Cited

U.S. PATENT DOCUMENTS

2020/0019435 A1* 1/2020 Stevenson .............. G06N 3/006

FOREIGN PATENT DOCUMENTS

CN  109977576 A  *  7/2019
CN  110083170 A  *  8/2019

OTHER PUBLICATIONS

Chethan Shivappa Thenehalli, "Design Optimization Using Augmented Lagrangian Particle Swarm Optimization" (Year: 2011).*

(Continued)

*Primary Examiner* — Assres H Woldemaryam (57) ABSTRACT

The disclosure describes a low-orbit satellite deorbit control method and system based on a particle swarm algorithm. The method includes: constructing an objective function according to a position parameter and a perturbation acceleration of each of particles in a particle swarm as well as a preset Lagrangian multiplier and a penalty factor; determining an objective fitness of each particle and a population fitness of the particle swarm based on the objective function, updating the position parameter and the velocity of each particle, and obtaining a population optimal fitness at a maximum number of iterations; updating the Lagrangian multiplier and the penalty factor according to the population optimal fitness, comparing the objective deviation value with a preset convergence condition, and determining an objective population fitness and an objective position parameter according to a comparison result to obtain an objective deorbit mode.

12 Claims, 8 Drawing Sheets

(56) References Cited

OTHER PUBLICATIONS

Neculai Andrei, "Particle Swarm Optimization Method for Engineering Nonlinear Constrained Optimization" (Year: 2017).*
Kai et al. "Using augmented Lagrangian particle swarm optimization for constrained problems in engineering" (Year: 2014).*
Dario et al.( doc. "Particle Swarm Optimization for Time-Optimal Spacecraft Reorientation with Keep-Out Cones"). (Year: 2016).*

* cited by examiner

(a) Semi-major axis deviation value throughout the iteration

—— Iteration process
---- Constraint threshold (b) Semi-major axis deviation after the 50th iteration

LOW-ORBIT SATELLITE DEORBIT CONTROL METHOD AND SYSTEM BASED ON PARTICLE SWARM ALGORITHM

CROSS REFERENCE TO RELATED APPLICATIONS

The present application claims the benefit of Chinese Patent Application No. 202010629155.7 filed on Jul. 1, 2020, the contents of which are incorporated herein by reference in their entirety.

FIELD OF THE INVENTION

The application relates to the technical field of constellation operation management, and in particular to a low-orbit satellite deorbit control method and system based on a particle swarm algorithm.

BACKGROUND OF THE INVENTION

With continuous increase of manned aerospace launching missions, low-orbital and medium-high orbital space is gradually congested, result in a progressive increase of the collision probability of satellite in-orbit operation. According to the "IADC Space Debris Mitigation Guidelines" compiled by Inter-Agency Space Debris Coordination Committee (IADC), when a natural orbit will serve more than 25 years, a low-orbit satellite at end of its lifetime needs to enter a disposal orbit and then burn down in the atmosphere within 25 years. Moreover, development of small satellite technology and reduction of launching costs may cause a sharp increase in the number of satellites in a low-orbit satellite constellation. OneWeb plans to launch a constellation composed of 2,620 satellites, Samgsung plans to launch a constellation composed of 4,600 satellites, Boeing plans to launch a constellation composed of 2956 satellites and Starlink eventually plans to launch a constellation composed of 42,000 satellites. Such constellations are huge and their satellites will affect the low-orbit space environment after expiration of their service life. Therefore, it is particularly important to take a reasonable approach to control the satellite at end of its lifetime in the low-orbit satellite constellation.

In related technologies, for low earth orbit (LEO) satellites, deorbit methods are generally divided into electric power cable deorbit, atmospheric drag deorbit, and satellite's own thruster deorbit. The satellite's own thruster deorbit can exhibit characteristics of short deorbit duration and flexible control when compared to other deorbit methods. As a typical small thruster, electric thrusters have been widely used in deep space exploration, orbit maintenance and orbit maneuvering. All satellites in the Starlink constellation may be equipped with electric thrusters. Fromm et al. simulated the deorbit duration of a satellite under the action of different small thrusters, and obtained a thrust range of the small thruster suitable for the deorbit of the simulated objective satellite. Huang et al. simulated and analyzed a deorbit process of a single satellite and OneWeb constellation, and obtained an optimal deorbit strategy of the single satellite and the constellation. However, the research on deorbit control in related technologies mainly focuses on the derivation of control rate, and has rarely mentioned algorithm implementation. Particle swarm algorithm has achieved excellent effects in various continuous space optimization problems, neural network training and other fields, but little on deorbit control, which may limit further research and accurate control of satellite space movement to a certain extent.

SUMMARY OF THE INVENTION

The problem to be solved by embodiments of the present invention is to provide a low-orbit satellite deorbit control method and system based on a particle swarm algorithm.

In order to solve above technical problem, the invention may be implemented as follows.

According to one aspect of the disclosure, it is provided a low-orbit satellite deorbit control method based on a particle swarm algorithm, including:

at step S1, constructing an objective function according to a position parameter and a perturbation acceleration of each of particles in a particle swarm as well as a preset Lagrangian multiplier and a preset penalty factor;

at step S2, calculating an objective function value of each particle in the particle swarm based on the objective function, determining an objective fitness of each particle and a population fitness of the particle swarm according to a calculation result, updating the position parameter and the velocity of each particle, and obtaining a population optimal fitness at a maximum number of iterations and the position parameters of particles corresponding to the population optimal fitness; and at step S3, updating the Lagrangian multiplier and the penalty factor according to the population optimal fitness, obtaining a current number of iterations and an objective deviation value based on the population optimal fitness, comparing the current number of iterations and the objective deviation value with a preset iteration condition and a preset convergence condition, and determining an objective population fitness and an objective position parameter according to a comparison result to obtain an objective deorbit mode.

In an exemplary embodiment of the disclosure, the step of constructing the objective function according to the position parameter and the perturbation acceleration of each of particles in the particle swarm as well as the preset Lagrangian multiplier and the preset penalty factor further includes:

at step S11, obtaining a rate of change of each orbital element over time under the thrust applied by a thruster, and determining a control rate containing current costate variables according to the rate of change;

at step S12, calculating a thrust vector, a fuel consumption rate, and a perturbation acceleration of the thrust applied by the thruster;

at step S13, determining a particle position vector according to the current costate variables, and using the particle position vector as the position parameter of each of the particles in the particle swarm;

at step S14, performing orbit integration of the control rate based on the position parameter and the perturbation acceleration, and constructing the objective function according to a integration result, the preset Lagrangian multiplier and the preset penalty factor.

In an exemplary embodiment of the disclosure, the steps of comparing the current number of iterations and the objective deviation value with the preset iteration condition and the preset convergence condition respectively and determining the objective population fitness and the objective position parameter according to the comparison result to obtain the objective deorbit mode further includes:

if the current number of iterations meets the preset iteration condition and the objective deviation value meets the preset convergence condition, determining the population optimal fitness as the objective population fitness, and determining the position parameter corresponding to the objective population fitness as the objective position parameter;

if the current number of iterations does not meet the preset iteration condition or the objective deviation value does not meet the preset convergence condition, updating the objective function based on the updated Lagrangian multiplier and the updated penalty factor, and continuing to perform step S14 and subsequent steps, until the current number of iterations meets the preset iteration condition and the objective deviation value meets the preset convergence condition.

In an exemplary embodiment of the disclosure, in step S11, the step of determining the control rate containing the current costate variables according to the rate of change further includes:

based on the rate of change and the current costate variables, obtaining a Hamiltonian function by equation (7):

$$H = \lambda_a \frac{da}{dt} + \lambda_e \frac{de}{dt} + \lambda_i \frac{di}{dt}; \qquad (7)$$

where H is a Hamiltonian function value, $\lambda_a$, $\lambda_e$ and $\lambda_i$ are the current costate variables, a, e and i are semi-major axis, eccentricity and orbital inclination of the operational orbit respectively, and t is time;

deriving a preset angle corresponding to the thrust applied by the thruster according to the Hamilton function (7) to obtain the control rate containing the current costate variables.

In an exemplary embodiment of the disclosure, in step S12, the thrust vector is obtained by equation (11), the fuel consumption rate is obtained by equation (12), and the perturbation acceleration is obtained by equation (14);

$$|\vec{F}_{thrust}| = \frac{2\eta P}{mgI_{sp}}; \qquad (11)$$

$$\frac{dm}{dt} = \frac{-2\eta P}{(gI_{sp})^2}; \qquad (12)$$

$$\begin{bmatrix} a_t \\ a_n \\ a_h \end{bmatrix} = \begin{bmatrix} \frac{pv}{h(1+e^2+2e\cos\theta)}(e\sin\theta * D + (1+e\cos\theta) * E) \\ -\frac{pv}{h(1+e^2+2e\cos\theta)}(-(1+e\cos\theta) * D + e\sin\theta * E) \\ F \end{bmatrix}; \qquad (14)$$

where $$\begin{cases} D = - \\ \frac{3}{2}\frac{GM_e}{r^2}\left(\frac{R_e}{r}\right)^2(1 - 3\sin^2 i \sin^2(\omega+\theta)) - \frac{1}{2}K_D\rho v\sqrt{\frac{GM_e}{p}}e\sin\theta \\ E = - \\ \frac{3}{2}\frac{GM_e}{r^2}\left(\frac{R_e}{r}\right)^2\sin^2 i \sin(2(\omega+\theta)) - \frac{1}{2}K_D\rho v\left(\sqrt{\frac{GM_e}{p}}\frac{p}{r} - \sigma r\cos i\right) \\ F = - \\ \frac{3}{2}\frac{GM_e}{r^2}\left(\frac{R_e}{r}\right)^2\sin 2i \sin(\omega+\theta) - \frac{1}{2}K_D\rho v\sigma r \sin i \cos(\theta+\omega) \end{cases} \qquad (13)$$

where $\eta$ is small thruster efficiency, P is small thruster power, m is spacecraft mass, g is acceleration of gravity, $I_{sp}$ is small thruster specific impulse, $GM_e$ is gravitational coefficient of the earth, having a value of $3.986\times10^{14}$, $R_e$ is radius of the earth, having a size of 6378137 m, $$K_D = C_D \frac{A}{m}\sqrt{k_r}, \quad C_D, \frac{A}{m}$$

is the satellite drag coefficient and area-to-mass ratio, $$k_r = 1 - \frac{2\sigma h \cos i}{v^2},$$

$\alpha=7.292\times10^{-5}$ is rotation velocity of the earth, $\rho$ is atmospheric density at the altitude of the orbit on which the satellite is located, v is tangential velocity, r is radial distance, $\theta$ is true anomaly, $\omega$ is argument of perigee, i is orbital inclination.

In an exemplary embodiment of the disclosure, in step S14, the objective function J shown in equation (16) is constructed:

$$J = f(x_i^k) + \Sigma_{j=1}^6 \lambda_j h_j(x_i^k) + \Sigma_{j=1}^6 r_j[h_j(x_i^k)]^2 \qquad (16);$$

where $h_j(x_i^k) = |\sigma_j - \sigma_j^*|$, $j=1, 2, \ldots, 6$ (17); $h_j(x_i^k)$ is an absolute value of the difference between the current orbital elements and the objective orbital elements generated by the control rate of a particle i in the k-th iteration, $\lambda_j$, $r_j$ are the Lagrangian multiplier and the penalty factor respectively, $f(x_i^k)$ is deorbit duration generated by the control rate of the particle i in the k-th iteration, which is obtained by orbital integration of the control rate based on the position parameter and the perturbation acceleration.

In an exemplary embodiment of the disclosure, in the process of orbit integration, if the orbit altitude increases and/or the eccentricity deviates from a threshold, the obtained integration result is deleted.

In an exemplary embodiment of the disclosure, in step S2, the position parameter and the velocity of each particle are updated by equation (18):

$$\begin{cases} x_i^{k+1} = \omega v_i^k + p_g^k + \rho_k(1 - 2m_1) \\ v_i^{k+1} = -x_i^k + p_g^k + \omega v_i^k + \rho_k(1 - 2m_1) \end{cases}; \qquad (18)$$

where $$\begin{cases} \omega = \omega_{max} - \frac{\omega_{max} - \omega_{min}}{k_{max}^2}k^2 \\ \rho_{k+1} = \begin{cases} 2\rho_k & n_s > s \\ 0.5\rho_k & n_f > f \\ 2\rho_k & \text{other} \end{cases} \end{cases} \qquad (19)$$

wherein the position and the velocity of a certain particle in the k-th iteration are $x_i^k$ and $v_i^k$ respectively, $\omega$ is inertia weight, $p_i^k$ is the best historical position of an individual in the past k iterations, $p_g^k$ is the best population historical position of the particle swarm after k iterations, $m_1$ is a random number between [0,1], $\rho_k$ is a random direction parameter, $n_s$, $n_f$ represents the relationship between current best population historical position $p_g^k$ and that of the previous iteration $p_g^{k-1}$, and if both are the same, $n_f$ is accumulated by one, otherwise $n_s$ is accumulated by one, s, f represent thresholds of $n_s$, $n_f$ respectively, $\omega_{max}$ is maximum value of inertia weight, $\omega_{min}$ is minimum value of inertia weight, $k_{max}$ is maximum number of iterations;

wherein in each previous iteration, an individual particle is compared with an individual historical value, and the particle swarm is compared with a population historical value, so that respective particle positions $p_i^k$ and $p_g^k$ corresponding to the minimum fitness are obtained.

In an exemplary embodiment of the disclosure, in step S14, the Lagrangian multiplier and the penalty factor are updated by equation (20):

$$\begin{cases} \lambda_j^{n+1} = \lambda_j^n + 2r_j^n h_j(x_{best}^n) \\ r_j^{n+1} = \begin{cases} 2r_j^n & h_j^2(x_{best}^n) > h_j^2(x_{best}^{n-1}) \wedge h_j^2(x_{best}^n) > \varepsilon_f \\ 0.5 r_j^n & h_j^2(x_{best}^n) \leq \varepsilon_f \\ r_j^n & \text{other} \end{cases} \end{cases} \quad (20)$$

wherein the value of $x_{best}^n$ is equal to the population optimal fitness $p_g^k$ obtained in step S2, $\varepsilon_f$ is a constraint threshold, $\lambda_j^n$, $r_j^n$ are the Lagrangian multiplier and the penalty factor respectively, where n is sequence number, $h_j(x_i^k)$ is an absolute value of the difference between the current orbital elements and the objective orbital elements generated by the control rate of a particle i in the k-th iteration.

In an exemplary embodiment of the disclosure, the orbital elements include semi-major axis a, eccentricity e, orbital inclination i, right ascension of the ascending node Ω, argument of perigee ω and true anomaly θ.

In an exemplary embodiment of the disclosure, the objective fitness and the population fitness are fitnesses corresponding to the minimum value of the objective function.

According to another aspect of the disclosure, it is provided a low-orbit satellite deorbit control system based on a particle swarm algorithm, including:

a construction unit configured to construct an objective function according to a position parameter and a perturbation acceleration of each of particles in a particle swarm as well as a preset Lagrangian multiplier and a preset penalty factor;

an updating unit configured to calculate an objective function value of each particle in the particle swarm based on the objective function, determine an objective fitness of each particle and a population fitness of the particle swarm according to a calculation result, update the position parameter and the velocity of each particle, and obtain a population optimal fitness at a maximum number of iterations and the position parameters of particles corresponding to the population optimal fitness; and a processing unit configured to update the Lagrangian multiplier and the penalty factor according to the population optimal fitness, obtain a current number of iterations and an objective deviation value based on the population optimal fitness, compare the current number of iterations and the objective deviation value with a preset iteration condition and a preset convergence condition, and determine an objective population fitness and an objective position parameter according to a comparison result to obtain an objective deorbit mode.

According to yet another aspect of the disclosure, it is provided a readable storage medium storing one or more readable programs adapted to cause a processor is executable by one or more processors to implement the steps of a low-orbit satellite deorbit control method based on a particle swarm algorithm according to the first aspect of the disclosure.

According to still yet another aspect of the disclosure, it is provided a computer device comprising a memory configured to store computer programs thereon, and a processor configured to execute the computer programs stored on the memory to implement the steps of a low-orbit satellite deorbit control method based on a particle swarm algorithm the first aspect of the disclosure.

Advantageous effects obtained by embodiments of the invention disclosed herein will be briefly explained.

(1) Compared with the traditional shooting method, the low-orbit satellite deorbit control method based on the particle swarm algorithm provided by the disclosure may be less sensitive to the initial value, and the search can be performed upon a given search range, which will greatly reduce difficulties in initial value determination.

(2) The low-orbit satellite deorbit control method based on the particle swarm algorithm provided by the disclosure has been improved for the position, velocity iteration formula and inertia weight iteration formula of the particle swarm algorithm, reducing the possibility of the algorithm falling into a local optimal solution, and improving the overall search ability and global convergence of the algorithm.

(3) The low-orbit satellite deorbit control method based on the particle swarm algorithm provided by the disclosure adopts the augmented Lagrangian method to introduce a secondary penalty term, and then corrects the Lagrangian multiplier by iteration to avoid ill-conditioned problems due to excessively large parameter values by the penalty function method, as well as transforms some constraints into the fitness function through the orbit integration program, which may reduce the constraints of the objective function and improve the calculation speed of the program. The present method can be utilized to obtain an optimal control rate that minimizes the low-thrust deorbit duration of low-orbit satellites, which introduces the advantages of insensitivity to initial values and fast convergence speed, and provides an effective solution for the engineering application of low-orbit satellite deorbit with small thrust.

BRIEF DESCRIPTION OF THE DRAWINGS

The accompanying drawings, which are incorporated in and constitute a part of this specification, illustrate exemplary embodiments of the present invention, and together with the description serve to explain the principles of the invention. Obviously, the following descriptions with reference to the drawings are merely descriptions of exemplary embodiments of the invention. For those skilled in the art, all other drawings may be obtained from those drawings without creative efforts.

DETAILED DESCRIPTION OF THE EMBODIMENTS

The technical problems to be solved and technical solutions and beneficial effects of the present disclosure will become apparent from the following detailed description with reference to the accompanying drawings and embodiments. It should be noted that the exemplary embodiments described herein are merely intended to explain the present invention, rather than limit the scope of the present invention.

The exemplary embodiment of the disclosure provides a low-orbit satellite deorbit control method based on a particle swarm algorithm. Firstly, three dimensions of particles are used to represent three costate variables, and all particles in the population are randomly initialized within a feasible region and a Lagrangian multiplier and a penalty factor are initialized respectively. Subsequently, an objective function is used as a fitness function of the particle swarm algorithm, a fitness function value is calculated for each particle, an optimal fitness of each particle and a population optimal fitness are updated, and the position and velocity of each of the particles are updated until a maximum number of iterations is reached; Finally, augmented Lagrangian function parameters are update, a new objective function is generate, the previous step is repeat until the number of iterations and constraint threshold requirements are met, and an optimization result is updated. This process combines the Hamiltonian function and the augmented Lagrangian particle swarm algorithm. Under the augmented Lagrangian function, the particle swarm algorithm can obtain costate variables corresponding to the shortest deorbit duration after multiple iterations, thereby achieving the optimal control rate.

Figure 1:
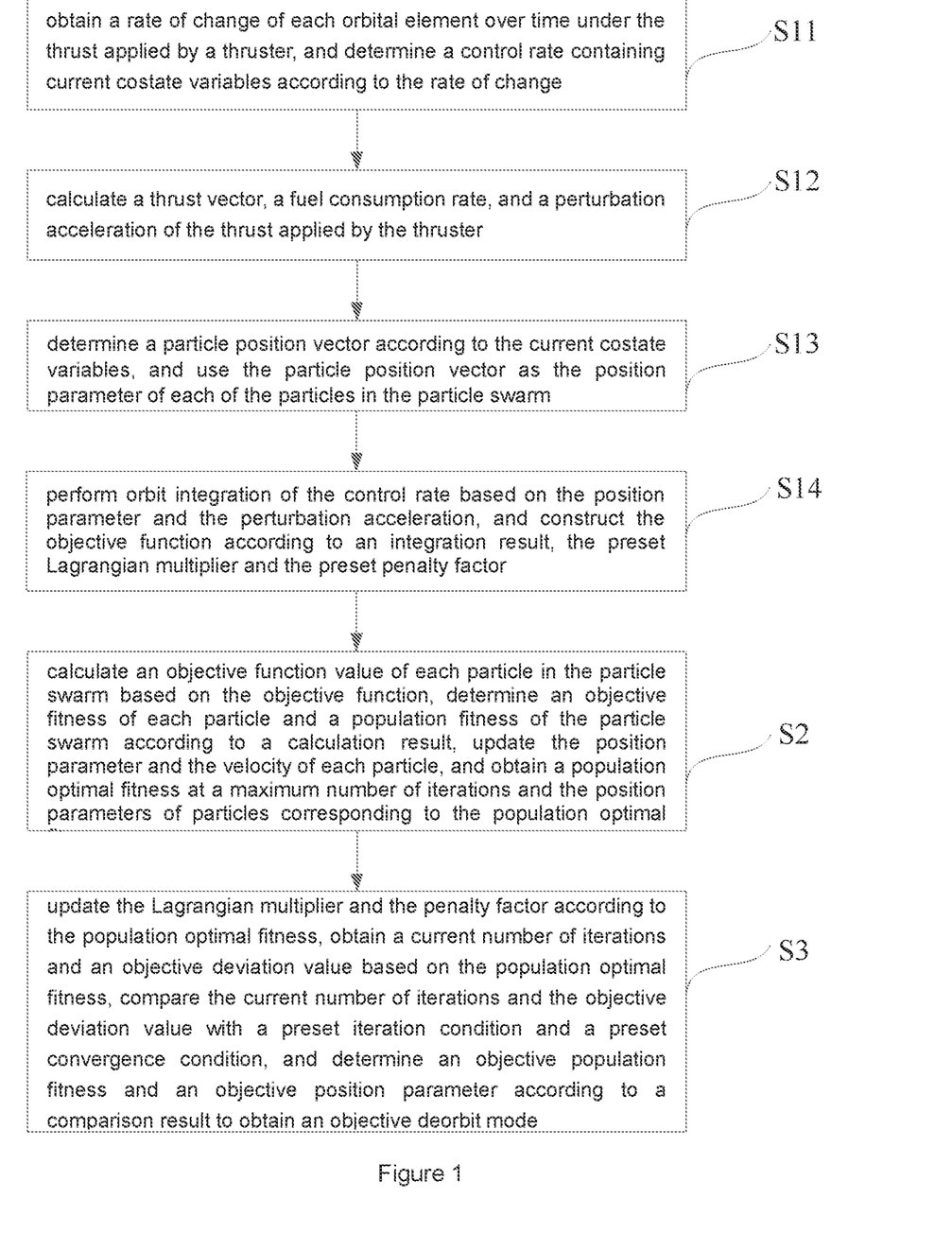
FIG. 1 is a flowchart illustrating a low-orbit satellite deorbit control method based on a particle swarm algorithm according to an exemplary embodiment of the disclosure.
Figure 2:
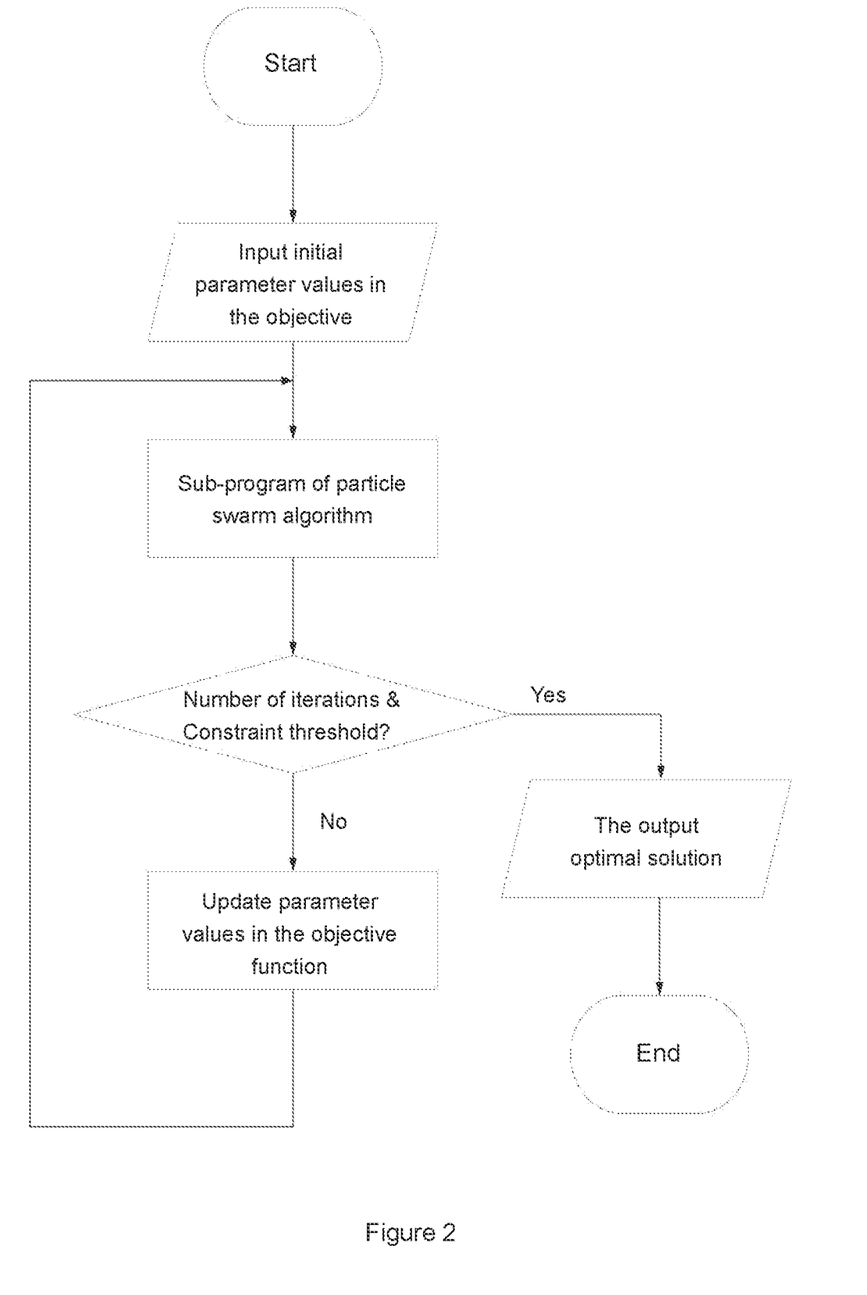
FIG. 2 is an outer block diagram illustrating an augmented Lagrangian particle swarm algorithm according to an exemplary embodiment of the disclosure.

Illustratively, FIG. 1 shows a flowchart of a low-orbit satellite deorbit control method based on a particle swarm algorithm according to an exemplary embodiment of the disclosure; and FIG. 2 shows an outer block diagram of an augmented Lagrangian particle swarm algorithm according to an exemplary embodiment of the disclosure. The method of embodiments of the disclosure will be described below with reference to FIGS. 1 and 2.

At S1, an objective function is constructed according to a position parameter and a perturbation acceleration of each of particles in a particle swarm as well as a preset Lagrangian multiplier and a penalty factor.

The method further includes the following steps.

At step S11, a rate of change of each orbital element over time under the thrust applied by a thruster is obtained, and a control rate containing current costate variables is determined according to the rate of change.

In this embodiment, the orbital elements include semi-major axis a, eccentricity e, orbital inclination i, right ascension of the ascending node $\Omega$, argument of perigee $\omega$ and true anomaly $\theta$, and the control rate containing current costate variables is obtained by the following steps S111, S112 and S113.

At step S111, the rate of change of each orbital element over time under the thrust applied by the thruster is obtained. In this case, the influence of the thrust by the thruster on the orbital element is calculated by:

$$\frac{da}{dt} = \frac{2a^2 v}{\mu} a_t; \quad (1)$$

$$\frac{de}{dt} = \frac{1}{v}\left(2(e+\cos\theta)a_t + \frac{r}{a}a_n\sin\theta\right); \quad (2)$$

$$\frac{di}{dt} = rh^{-1}a_h\cos(\omega + \theta); \quad (3)$$

$$\frac{d\Omega}{dt} = \frac{r\sin(\omega + \theta)}{h\sin i}a_h; \quad (4)$$

$$\frac{d\omega}{dt} = -\frac{d\Omega}{dt}\cos i + \frac{1}{ev}\left(2a_t\sin\theta - \left(2e + \frac{r}{a}\cos\theta\right)a_n\right); \quad (5)$$

$$\frac{d\theta}{dt} = \frac{h}{r^2} - \frac{1}{ev}\left(2a_t\sin\theta - \left(2e + \frac{r}{a}\cos\theta\right)a_n\right); \quad (6)$$

where $p = a(1-e^2),$ $h = \sqrt{\mu p},$ $v = \sqrt{\frac{2\mu}{r} - \frac{\mu}{a}},$ $r = \frac{p}{(1+e\cos\theta)},$ $\mu = 3.986 \times 10^{14},$ where p, h, r, v, $\mu$ are indicated in these equations, v is satellite velocity, $\mu$ is gravitational coefficient of the earth, $a_{n,t,h}$ is perturbation acceleration of occlusive orbit in the radial direction (radially outward), in the velocity direction (along the direction of velocity) and in the angular momentum direction (the direction of angular momentum of the occlusive orbit may be positive).

At S112, based on the rate of change and the current costate variables, a Hamiltonian function is obtained by equation (7).

In this embodiment, the Hamiltonian function is calculated by:

$$H = \lambda_a \frac{da}{dt} + \lambda_e \frac{de}{dt} + \lambda_i \frac{di}{dt}; \quad (7)$$

where H is a Hamiltonian function value, $\lambda_a$, $\lambda_e$ and $\lambda_i$ are the current costate variables, a, e and i are semi-major axis, eccentricity and orbital inclination of the operational orbit respectively, and t is time.

At step S113, a preset angle corresponding to the thrust applied by the thruster is derived according to the Hamilton function (7) to obtain the control rate containing the current costate variables.

Figure 4:
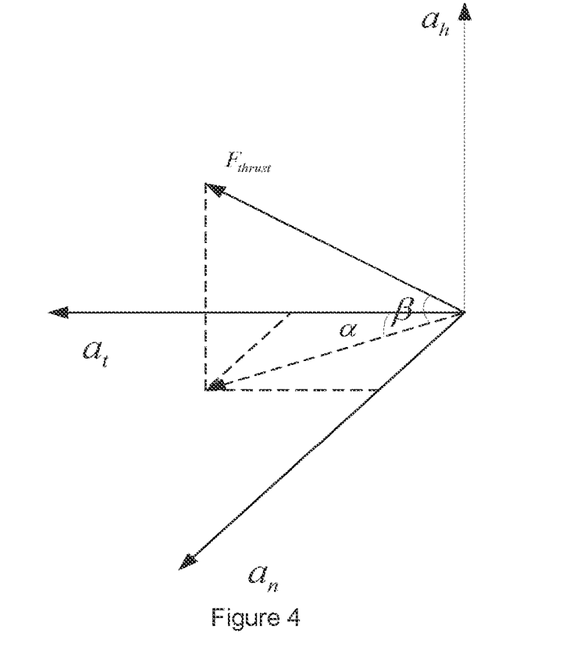
FIG. 4 is a schematic diagram illustrating the thrust direction of a small thruster according to an exemplary embodiment of the disclosure.

Herein, FIG. 4 shows a schematic diagram of the thrust direction of a small thruster according to an exemplary embodiment of the disclosure. The process of determining the control rate in the embodiment will be described below with reference to FIG. 4. During the process, a control rate containing current costate variables at the angles α and β as shown in FIG. 4 is calculated, where the partial derivatives of the Hamilton function may be taken with respect to α and β respectively, and a plurality of simultaneous equations may be set as follows:

$$A = \lambda_e \frac{r}{a} \sin\theta \quad (8)$$

$$B = \lambda_a \frac{a^2 v^2}{\mu} + \lambda_e (e + \cos\theta)$$

$$\sin\alpha^* = \frac{-A}{\sqrt{4B^2 + A^2}}$$

$$\cos\alpha^* = \frac{-2B}{\sqrt{4B^2 + A^2}};$$

$$C = \lambda_i \frac{rv}{h} \cos(\omega + \theta) \quad (9)$$

$$D = \lambda_a \frac{2a^2 v^2}{\mu} \cos\alpha^*$$

$$E = \lambda_e \left(2(e + \cos\theta)\cos\alpha^* + \frac{r}{a}\sin\theta \sin\alpha^*\right)$$

$$\sin\beta^* = \frac{-C}{\sqrt{C^2 + D^2 + E^2}}$$

$$\cos\beta^* = \frac{-(D + E)}{\sqrt{C^2 + D^2 + E^2}}.$$

At step S12, a thrust vector, a fuel consumption rate, and a perturbation acceleration of the thrust applied by the thruster are calculated.

In this embodiment, the vector of the small thrust and the fuel consumption rate shown in FIG. 4 are calculated, and the non-spherical perturbation and the perturbation acceleration of the atmospheric drag perturbation are calculated. $J_2$ At step S121, the thrust vector of the thruster is calculated by:

$$[a_n \ a_t \ a_h]^T = |\vec{F}_{thrust}| [\sin\alpha \cos\beta \ \cos\alpha \cos\beta \ \sin\beta]^T; \quad (10)$$

$$|\vec{F}_{thrust}| = \frac{2\eta P}{mgI_{sp}}; \quad (11)$$

The fuel consumption rate is calculated by:

$$\frac{dm}{dt} = \frac{-2\eta P}{(gI_{sp})^2}; \quad (12)$$

where η is small thruster efficiency, P is small thruster power, m is spacecraft mass, g is acceleration of gravity, and $I_{sp}$ is small thruster specific impulse.

At step S122, the nonspherical $J_2$ perturbation and the perturbation acceleration of the atmospheric drag perturbation are calculated.

The perturbation acceleration is calculated by:

$$\begin{cases} D = \begin{array}{l} -\frac{3}{2}\frac{GM_e}{r^2}\left(\frac{R_e}{r}\right)^2(1 - 3\sin^2 i \sin^2(\omega + \theta)) - \\ \frac{1}{2}K_D\rho v\sqrt{\frac{GM_e}{p}} e \sin\theta \end{array} \\ E = \begin{array}{l} -\frac{3}{2}\frac{GM_e}{r^2}\left(\frac{R_e}{r}\right)^2 \sin^2 i \sin(2(\omega + \theta)) - \\ \frac{1}{2}K_D\rho v\left(\sqrt{\frac{GM_e}{p}}\frac{p}{r} - \sigma r \cos i\right) \end{array} \\ F = \begin{array}{l} -\frac{3}{2}\frac{GM_e}{r^2}\left(\frac{R_e}{r}\right)^2 \sin 2i \sin(\omega + \theta) - \\ \frac{1}{2}K_D\rho v\sigma r \sin i \cos(\theta + \omega) \end{array} \end{cases} \quad (13)$$

$$\begin{bmatrix} a_t \\ a_n \\ a_h \end{bmatrix} = \begin{bmatrix} \frac{pv}{h(1 + e^2 + 2e\cos\theta)}(e\sin\theta * D + \\ (1 + e\cos\theta) * E) \\ -\frac{pv}{h(1 + e^2 + 2e\cos\theta)}(- \\ (1 + e\cos\theta) * D + e\sin\theta * E) \\ F \end{bmatrix}; \quad (14)$$

where, $GM_e$ is gravitational coefficient of the earth, having a value of $3.986 \times 10^{14}$, $R_e$ is radius of the earth, having a size of 6378137 m, $$K_D = C_D \frac{A}{m} \sqrt{k_r}, C_D, \frac{A}{m}$$

is the satellite drag coefficient and area-to-mass ratio, $$k_r = 1 - \frac{2\sigma h \cos i}{v^2},$$

$\sigma = 7.292 \times 10^{-5}$ is rotation velocity of the earth, ρ is atmospheric density at the altitude of the orbit on which the satellite is located, v is tangential velocity, r is radial distance, θ is true anomaly, ω is argument of perigee, and i is orbital inclination.

At step S13, a particle position vector is determined according to the current costate variables, and the particle position vector is used as the position parameter of each of the particles in the particle swarm.

In this embodiment, the costate variable is used as the particle position vector, and the particle position vector is calculated by:

$$\lambda_i = [\lambda_a \lambda_e \lambda_i] \quad (15).$$

At step S14, orbit integration of the control rate is performed based on the position parameter and the perturbation acceleration, and the objective function is constructed according to a integration result, the preset Lagrangian multiplier and the penalty factor;

In this embodiment, the objective function J shown in equation (16) is constructed:

$$J=f(x_i^k)+\Sigma_{j=1}^{6}\lambda_j h_j(x_i^k)+\Sigma_{j=1}^{6}r_j[h_j(x_i^k)]^2 \quad (16)$$

where $h_j(x_i^k)=|\sigma_j-\sigma_j^*|$, j=1, 2, . . . , 6 (17); $h_j(x_i^k)$ is an absolute value of the difference between the current orbital elements and the objective orbital elements generated by the control rate of a particle i in the k-th iteration, $\lambda_j, r_j$ are the Lagrangian multiplier and the penalty factor respectively, $f(x_i^k)$ is deorbit duration generated by the control rate of the particle i in the k-th iteration, which is obtained by orbital integration of the control rate based on the position parameter and the perturbation acceleration (implemented by integration of equations (1) to (6)). $\lambda_j, r_j$ remains unchanged during the sub-problem solving operation.

It should be noted that some constraints may be implemented in the orbital integration process through corresponding processing. Since the initial position value of each of the particles is random, some particles may cause abnormal conditions such as an increase in orbital altitude and abnormal eccentricity during orbital integration. To solve such a problem, an interruption condition can be set during the orbital integration process and the deorbit duration is returned as an infinite value. The fitness value of each of these particles also becomes infinite, which is eliminated in fitness screening.

At step S2, an objective function value of each particle in the particle swarm is calculated based on the objective function, an objective fitness of each particle and a population fitness of the particle swarm are determined according to a calculation result, the position parameter and the velocity of each particle are updated, and a population optimal fitness at a maximum number of iterations and the position parameters of particles corresponding to the population optimal fitness is obtained, wherein the population optimal fitness is a population fitness that is output when the preset maximum number of iterations is met.

In this embodiment, the objective fitness and the population fitness are fitnesses corresponding to the minimum value of the objective function.

Figure 3:
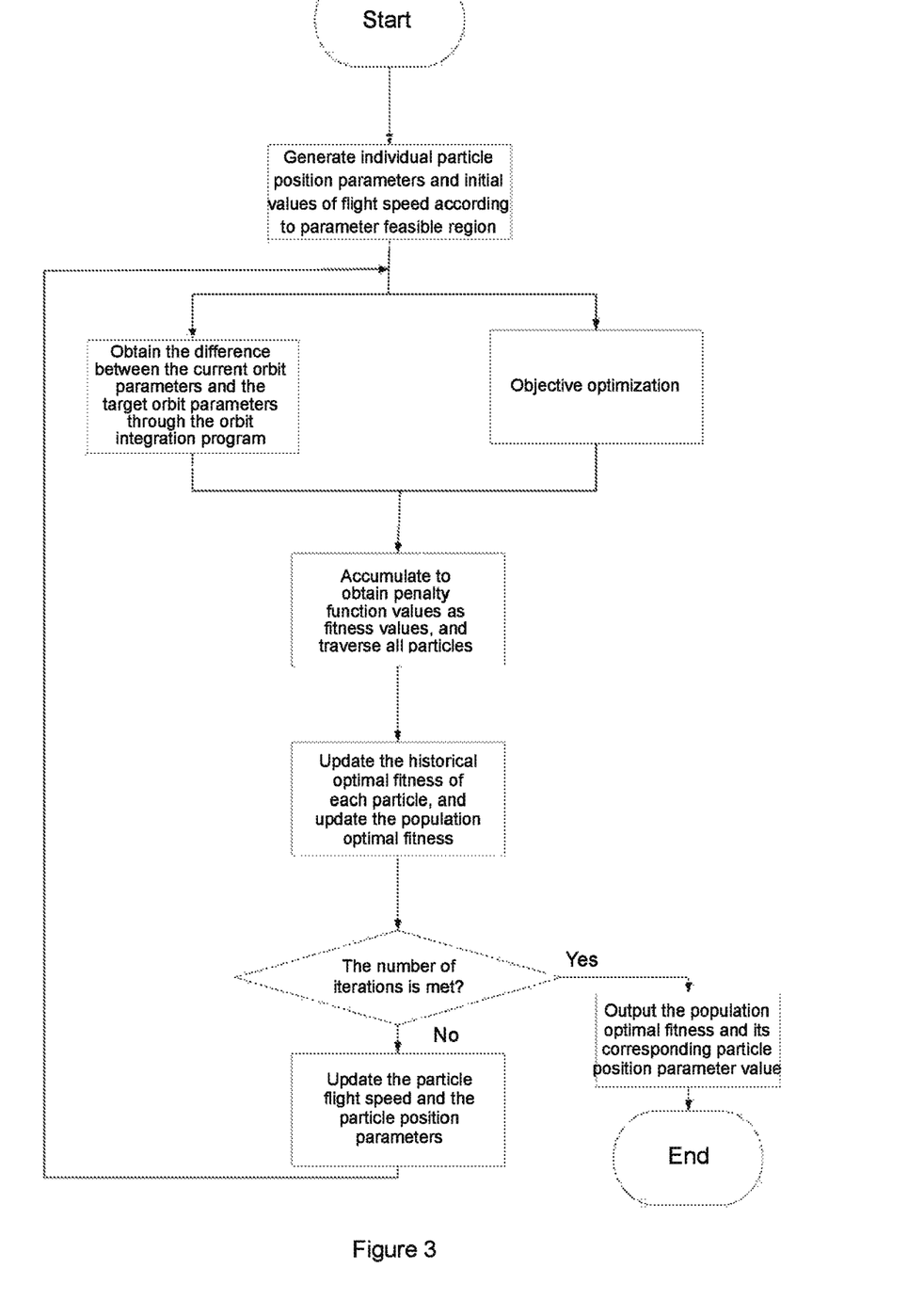
FIG. 3 is a block diagram illustrating a sub-program of a particle swarm algorithm according to an exemplary embodiment of the disclosure.

The optimal fitness of each particle $p_i^k$ and the population optimal fitness $p_g^k$ are obtained by comparing respective objective function values of respective particles in the population (the smallest is the optimum), the position and the velocity of each particle are updated, and an optimization result of the subroutine is output when the preset number of iterations is met (see FIG. 3).

In this case, the position parameter and the velocity of each particle are updated by equation (18):

$$\begin{cases} x_i^{k+1} = \omega v_i^k + p_g^k + \rho_k(1-2m_1) \\ v_i^{k+1} = -x_i^k + p_g^k + \omega v_i^k + \rho_k(1-2m_1) \end{cases} \quad (18)$$

where $$\begin{cases} \omega = \omega_{max} - \frac{\omega_{max}-\omega_{min}}{k_{max}^2}k^2 \\ \rho_{k+1} = \begin{cases} 2\rho_k & n_s > s \\ 0.5\rho_k & n_f > f \\ 2\rho_k & \text{other} \end{cases} \end{cases} \quad (19)$$

wherein the position and velocity of a certain particle in the k-th iteration are $x_i^k$ and $v_i^k$ respectively, $\omega$ is inertia weight, $p_i^k$ is the best historical position of the individual in the past k iterations, $p_g^k$ is the best population historical position of the particle swarm after k iterations, $m_1$ is a random number between [0,1], $\rho_k$ is a random direction parameter, $n_s, n_f$ represents the relationship between current best population historical position $p_g^k$ and that of the previous iteration $p_g^{k-1}$, and if both are the same, $n_f$ is accumulated by one, otherwise $n_s$ is accumulated by one, s, f represent thresholds of $n_s, n_f$ respectively, $\omega_{max}$ is maximum value of inertia weight, $\omega_{min}$ is minimum value of inertia weight, $k_{max}$ is maximum number of iterations;

wherein in each previous iteration, an individual particle is compared with an individual historical value, and the particle swarm is compared with a population historical value, so that respective particle positions $p_i^k$ and $p_g^k$ corresponding to the minimum fitness are obtained.

At step S3, the Lagrangian multiplier and the penalty factor are updated according to the population optimal fitness, a current number of iterations and an objective deviation value are obtained based on the population optimal fitness, the current number of iterations and the objective deviation value are compared with a preset iteration condition and a preset convergence condition, and an objective population fitness and an objective position parameter are determined according to a comparison result to obtain an objective deorbit mode. In this case, the objective deviation value based on the population optimal fitness is the deviation value between the semi-major axis or the perigee generated by the position parameter integration corresponding to the population optimal fitness obtained in step S2 and the target.

In this embodiment, if the current number of iterations meets the preset iteration condition and the objective deviation value meets the convergence condition, the population optimal fitness is determined as the objective population fitness, and the position parameter corresponding to the objective population fitness is determined as the objective position parameter.

If the current number of iterations does not meet the preset iteration condition or the objective deviation value does not meet the convergence condition, the objective function is updated based on the updated Lagrangian multiplier and the penalty factor, and step S14 and subsequent steps are continued to be performed, until the current number of iterations meets the preset iteration condition and the objective deviation value meets the convergence condition.

In this case, the Lagrange multiplier $\lambda_j^n$ and the penalty factor $r_j^n$ is updated by calculation of:

$$\begin{cases} \lambda_j^{n+1} = \lambda_j^n + 2r_j^n h_j(x_{best}^n) \\ r_j^{n+1} = \begin{cases} 2r_j^n & h_j^2(x_{best}^n) > h_j^2(x_{best}^{n-1}) \wedge h_j^2(x_{best}^n) > \varepsilon_f \\ 0.5r_j^n & h_j^2(x_{best}^n) \le \varepsilon_f \\ r_j^n & \text{other} \end{cases} \end{cases} \quad (1)$$

where the value of $x_{best}^n$ is equal to the population optimal fitness $p_g^k$ obtained in step S2 (an optimal solution to the sub-problem shown in FIG. 3 is obtained), $\varepsilon_f$ is a constraint threshold, $\lambda_j^n, r_j^n$ are the Lagrangian multiplier and the penalty factor respectively, where n is sequence number, $h_j(x_i^k)$ is an absolute value of the difference between the current orbital elements and the objective orbital elements generated by the control rate of a particle i in the k-th iteration.

In this case, if the optimal solution $x_{best}^n$ does not satisfy the constraint condition, the procedure returns to step S14, a new objective function is calculated by the updated Lagrangian multiplier and penalty factor, and then the procedure proceeds to subsequent steps until the constraint condition is satisfied $\varepsilon_f$.

In the low-orbit satellite deorbit control method based on the particle swarm algorithm of the disclosure, firstly a control rate with costate variables is derived from a Hamiltonian function; subsequently, costate variable vectors are used as position parameters of particles in a particle swarm to operate a particle swarm algorithm subroutine with a current objective function (FIG. 3), an optimal fitness $p_i^k$ of each particle, a population optimal fitness $p_g^k$ and the position and velocity of each of the particles are updated in each iteration, and an optimization result is output when a maximum number of iterations is met; finally, according to the optimization result obtained by the subroutine, parameters in the augmented Lagrangian function are updated, and then a new objective function is obtained for the next subroutine iteration, and an optimization result is output when the number of iterations and constraint threshold requirements are met. The method can be utilized to obtain an optimal control rate that minimizes the low-thrust deorbit duration of low-orbit satellites, which introduces the advantages of insensitivity to initial values and fast convergence speed, and provides an effective solution for the engineering application of low-orbit satellite deorbit with small thrust.

Embodiment 1

The low-orbit satellite deorbit control method based on the particle swarm algorithm of the disclosure will be described below in conjunction with this embodiment. The embodiment may be achieved by the following steps: at the first step, parameters of a spacecraft itself and parameters of a small thruster are given; at the second step, semi-major axis, eccentricity and orbital inclination of an operational orbit and two disposal orbits of the spacecraft are given; at the third step, parameters of an augmented Lagrangian particle swarm algorithm are given; at the fourth step, deorbit duration without thrust is calculate; at the fifth step, an optimal control rate, deorbit duration and fuel consumption of the two disposal orbits are calculated.

Herein the parameters of the spacecraft itself and the parameters of the small thruster are shown in Table 1, the semi-major axis, eccentricity and orbit inclination on an operational orbit and two disposal orbits of the spacecraft are shown in Table 2, the parameters of the augmented Lagrangian particle swarm algorithm are shown in Table 3, and the optimal control rate, deorbit duration and fuel consumption of the two disposal orbits are shown in Table 4.

TABLE 1

Spacecraft Parameters

| parameter | Numerical value | parameter | Numerical value |
|---|---|---|---|
| Mass of Satellite | 1000.0 kg | Specific Impulse | 4660 s |
| Atmospheric Drag Coefficient | 2 | Thruster Power | 115 W |
| Area-to-Mass Ratio | 0.02 m$^2$/kg | Engine Thrust | 3 mN |
| Thruster efficiency | 24.5% | Atmospheric model | SA76 |

TABLE 2

Operational Orbit and Disposal Orbit Parameters

| Orbit Elements | Operational Orbit | First Disposal Orbit | Second Disposal Orbit |
|---|---|---|---|
| Semi-Major Axis (km) | 7200 | 6528 | 7200 |
| Eccentricity | 0.001 | 0.001 | 0.093 |
| Orbital Inclination (degrees) | 98.5 | 98.5 | 98.5 |

TABLE 3

Augmented Lagrangian Particle Swarm Algorithm Parameters

| Algorithm Parameter | Numerical Value |
|---|---|
| Number of Populations N | 500 |
| Maximum Number of Iterations $k_{max}$ | 50 |
| Maximum Inertia Weight $\omega_{max}$ | 0.9 |
| Minimum Inertia Weight $\omega_{min}$ | 0.4 |
| Threshold of $n_s$ s | 15 |
| Threshold of $n_f$ f | 5 |
| Initial Value of Random Direction Parameter $\rho_0$ | 1 |
| Initial Penalty Factor $r_0$ | 1000 |
| Constraint Threshold $\varepsilon_f$ | 0.0001 |

TABLE 4

Optimal Control Rate, Deorbit Duration and Fuel Consumption on Two Disposal Orbits

| Parameter | $\lambda_a$ | $\lambda_e$ | $\lambda_i$ | Deorbit Duration | Fuel Consumption |
|---|---|---|---|---|---|
| Particle Swarm Search Range (Type 1) | [−10/a, 10/a] | [−10, 10] | [−10, 10] | | |
| Particle Swarm Search Range (Type 2) | [−10/a, 10/a] | [−1 × 10$^6$, 1 × 10$^6$] | [−10, 10] | | |
| Optimal Solution (First Disposal Orbit) | −1.389 × 10$^{-6}$ | −4.074 | 6.563 | 857 days | 2.00 kg |
| Optimal Solution (Second Disposal Orbit) | −1.389 × 10$^{-7}$ | −2223.345 | 10 | 1607 days | 3.75 kg |

Figure 5:
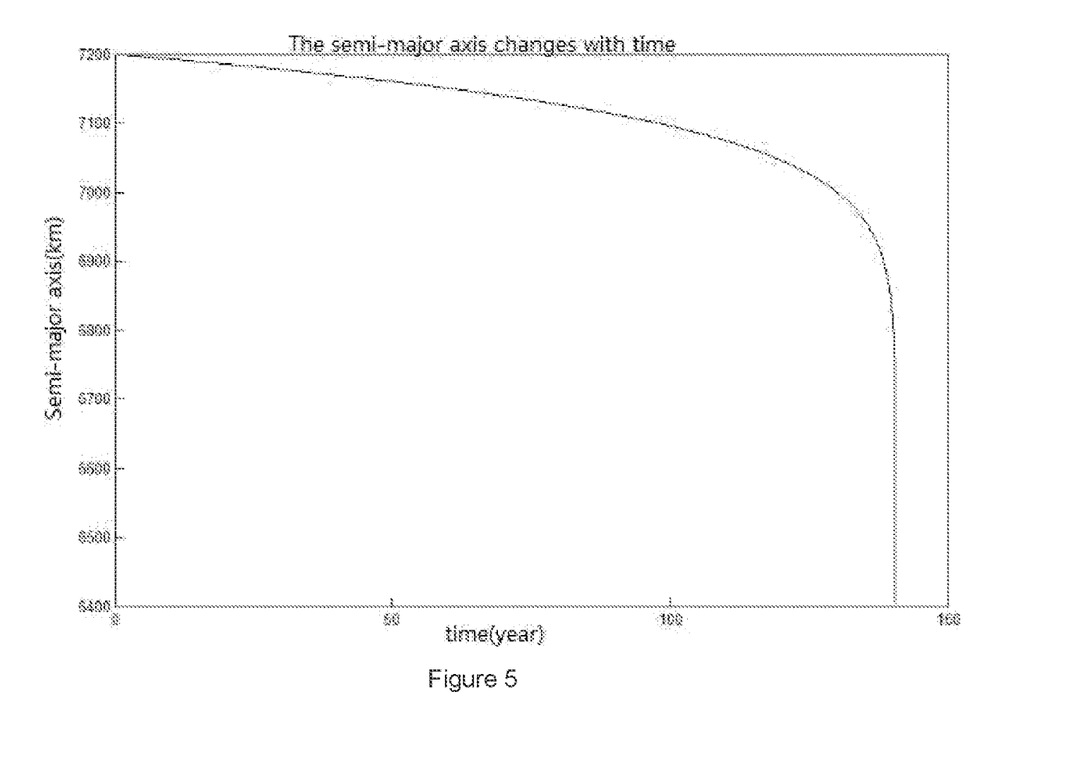
FIG. 5 shows the result of variation of semi-major axis over time under natural conditions according to an exemplary embodiment of the disclosure.
Figure 6:
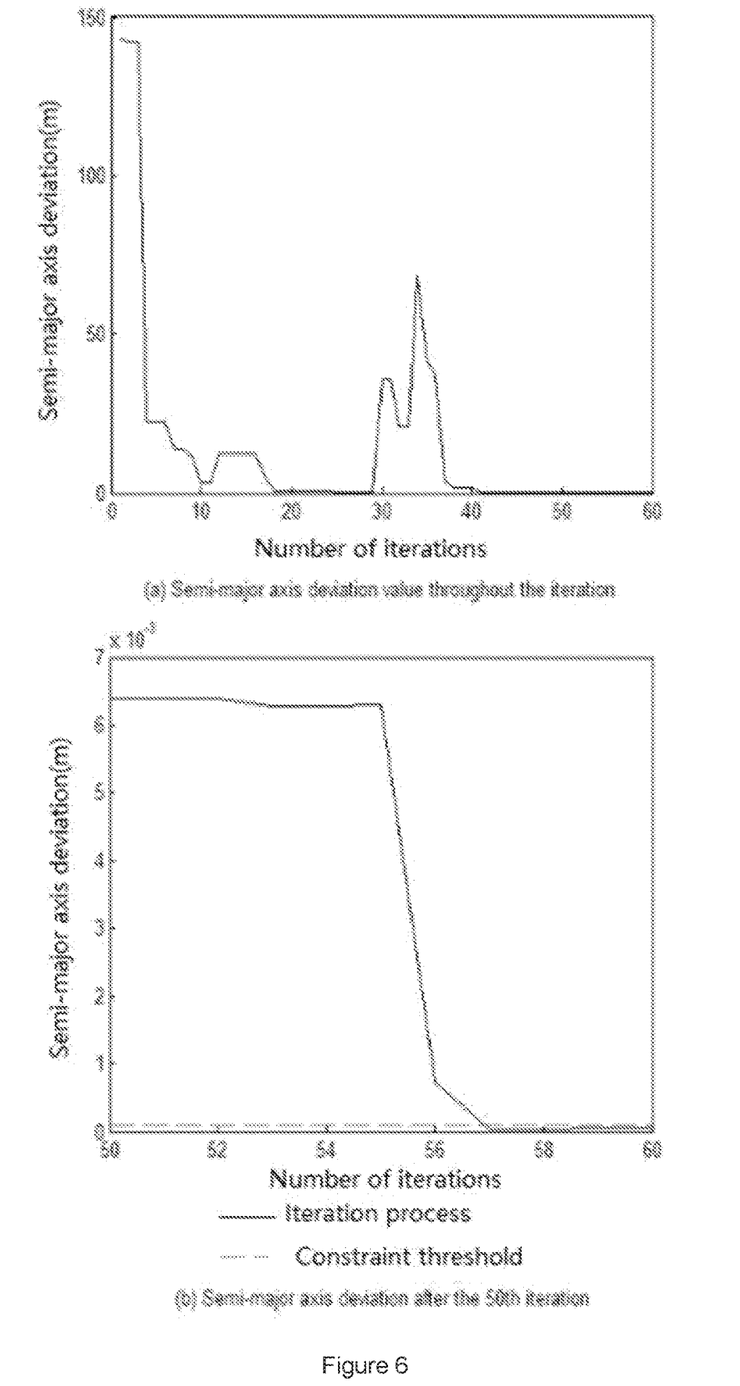
FIG. 6 shows the iterative process of a first disposal orbit routine according to an exemplary embodiment of the disclosure.
Figure 7:
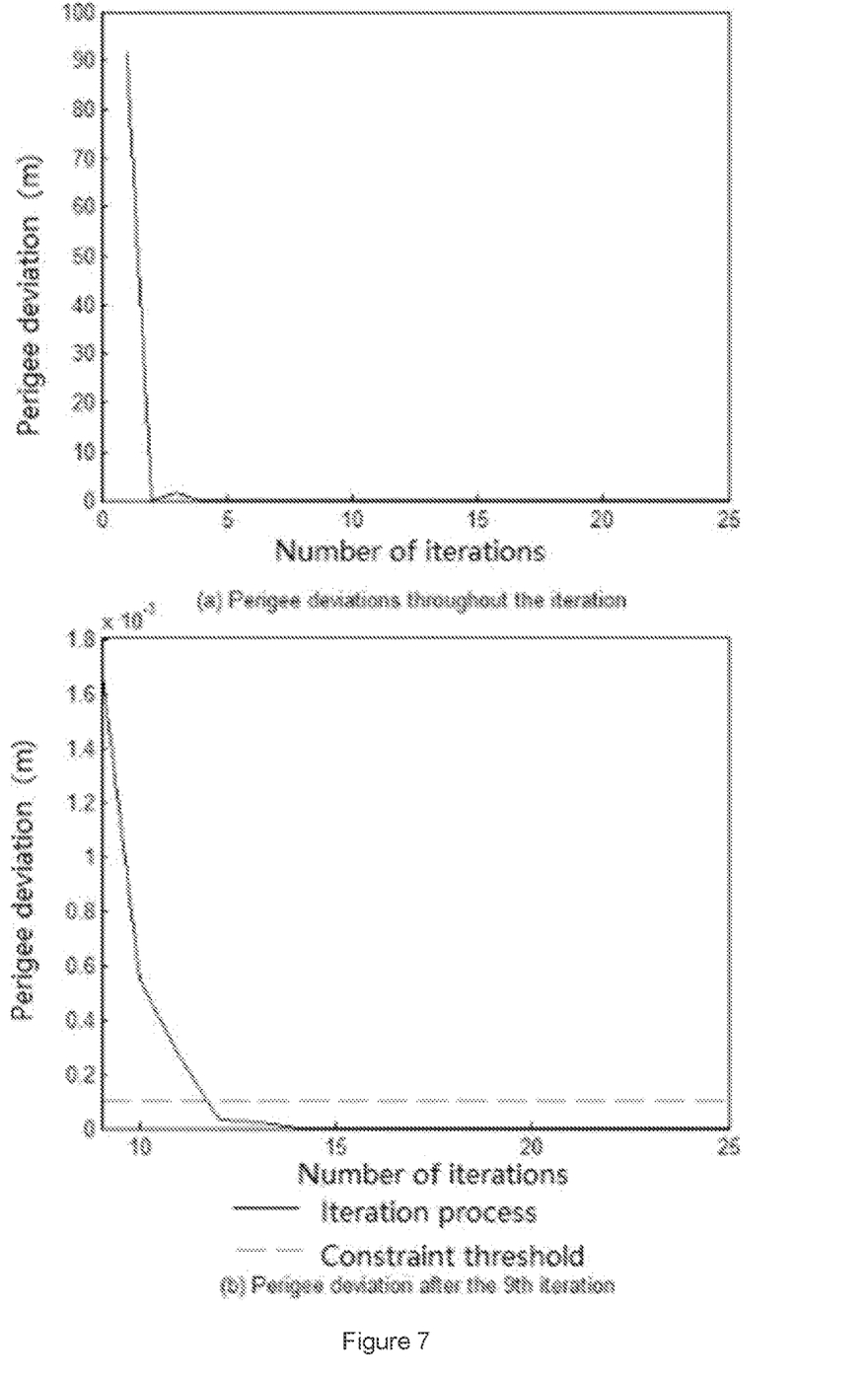
FIG. 7 shows the iterative process of a second disposal orbit routine according to an exemplary embodiment of the disclosure.
Figure 8:
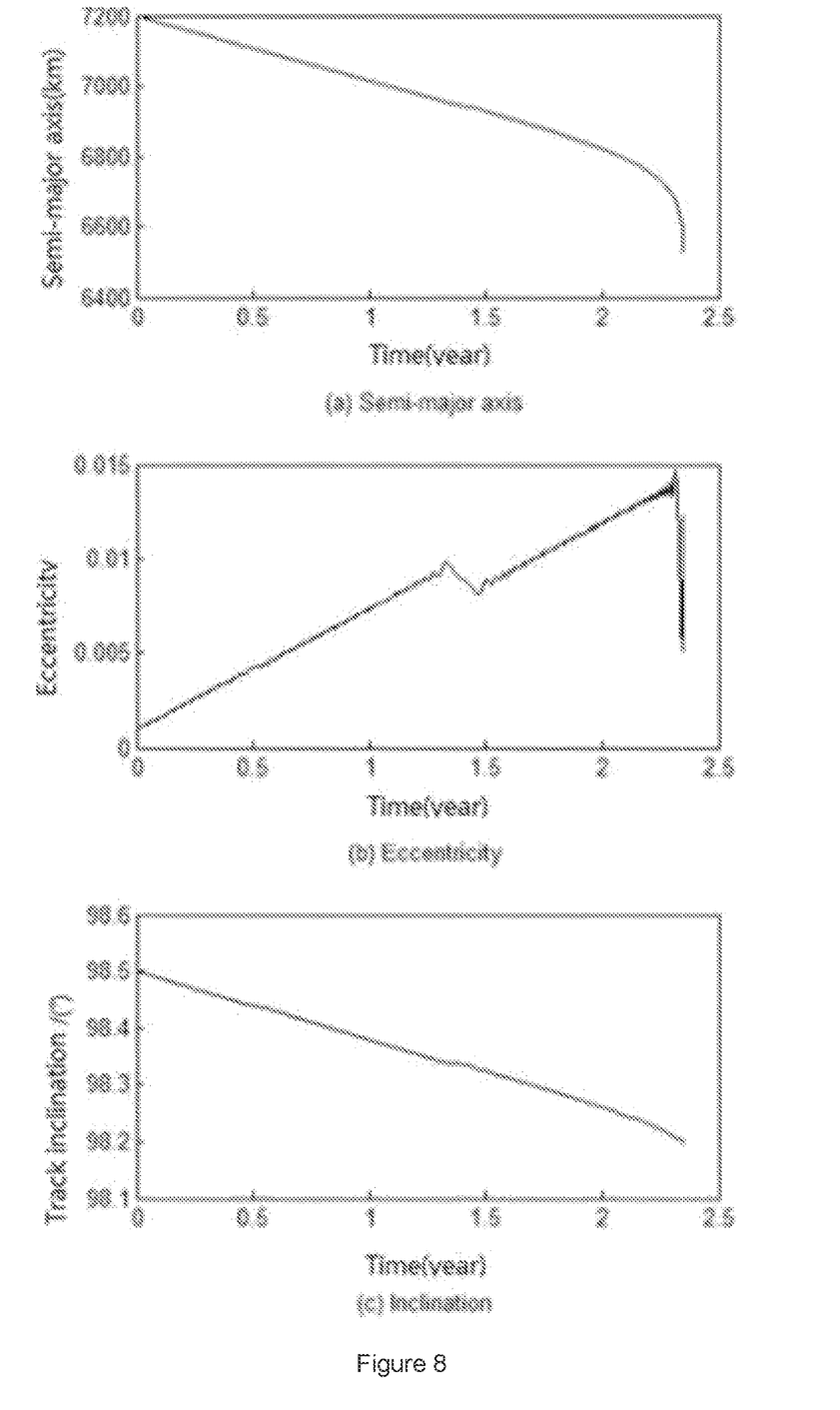
FIG. 8 shows the change of the semi-major axis, eccentricity, and orbit inclination of the satellite under the optimal control rate according to an exemplary embodiment of the disclosure (the first disposal orbit)
Figure 9:
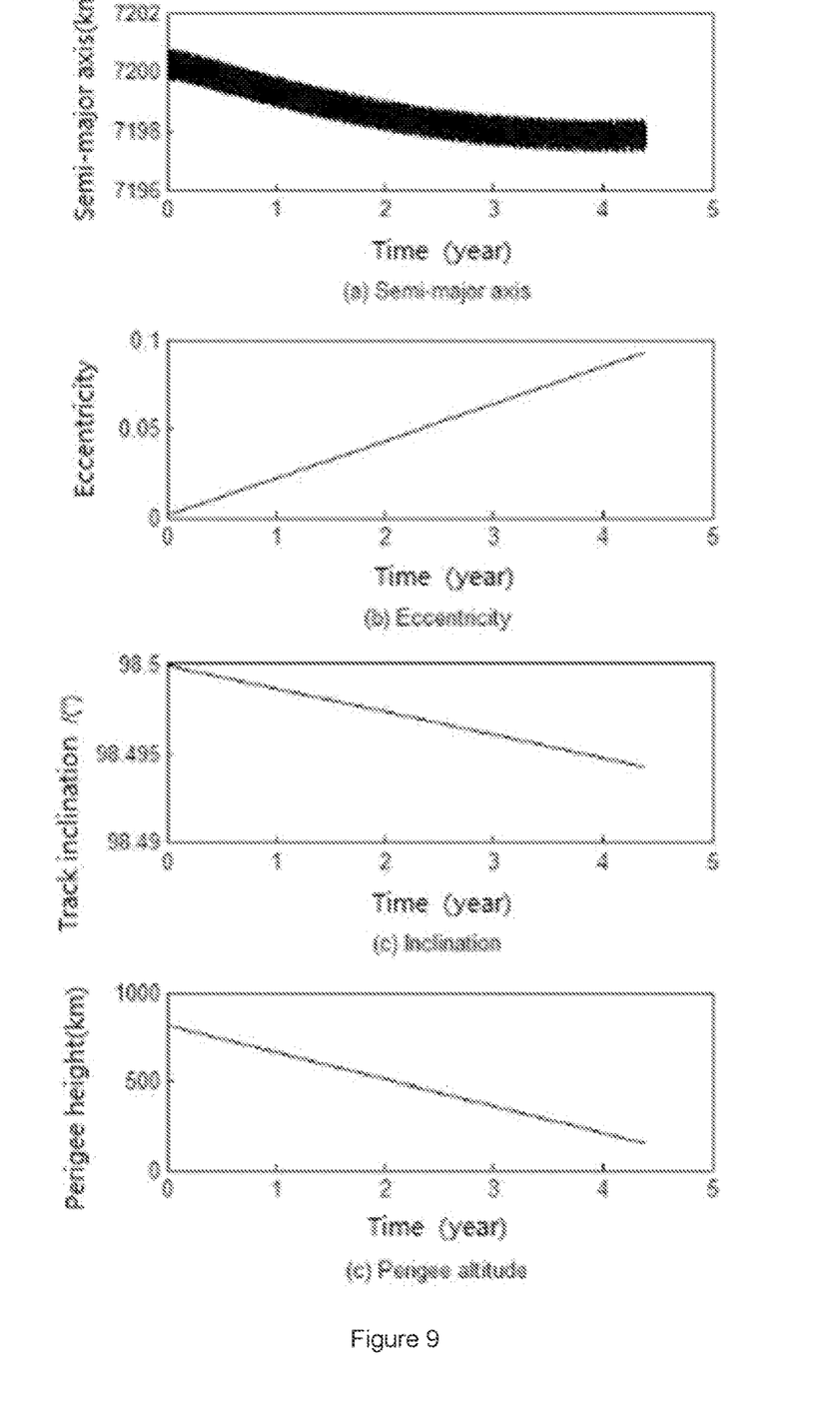
FIG. 9 shows the change of the semi-major axis, eccentricity, and orbital inclination of the satellite under the optimal control rate according to an exemplary embodiment of the disclosure (the second disposal orbit).

FIG. 5 is a graph showing variation of semi-major axis over time without thrust according to Embodiment 1 of the disclosure. As seen from FIG. 5, the deorbit duration without thrust under natural conditions will be 140 years, far beyond the 25 years deorbit requirement. FIGS. 6 and 7 show the results of iterations in the two disposal orbits respectively. FIG. 6 illustrates a total of 60 iterations in the process, and the semi-major axis deviation convergence condition will be met at the 57th iteration. FIG. 7 illustrates a total of 25 iterations in the process, and the perigee deviation convergence condition will be met at the 12th iteration. FIGS. 8 and 9 show graphs of variation of semi-major axis, eccentricity and orbital inclination over time on the two disposal orbit respectively. As seen from FIGS. 8 and 9, the spacecraft can reach the corresponding objective orbit (disposal orbit) under the optimal control rate obtained by the disclosure. Based on this effect, the effectiveness of the optimal control rate obtained by the disclosed algorithm is proved.

Another exemplary embodiment of the disclosure provides a low-orbit satellite deorbit control system based on a particle swarm algorithm, including: a construction unit configured to construct an objective function according to a position parameter and a perturbation acceleration of each of particles in a particle swarm as well as a preset Lagrangian multiplier and a penalty factor; an updating unit configured to calculate an objective function value of each particle in the particle swarm based on the objective function, determine an objective fitness of each particle and a population fitness of the particle swarm according to a calculation result, update the position parameter and the velocity of each particle, and obtain a population optimal fitness at a maximum number of iterations and the position parameters of particles corresponding to the population optimal fitness; and a processing unit configured to update the Lagrangian multiplier and the penalty factor according to the population optimal fitness, obtain a current number of iterations and an objective deviation value based on the population optimal fitness, compare the current number of iterations and the objective deviation value with a preset iteration condition and a preset convergence condition, and determine an objective population fitness and an objective position parameter according to a comparison result to obtain an objective deorbit mode.

The detailed description of each unit in the aforementioned control system can refer to the description of each step in the control method, which will not be repeatedly described. The aforementioned control system can achieve the same function as the control method.

On the basis of the above-mentioned embodiments, an embodiment of the disclosure provides a computer readable storage medium storing one or more readable programs adapted to cause a processor is executable by one or more processors to implement the steps of a low-orbit satellite deorbit control method based on a particle swarm algorithm as described in the first embodiment, for example.

Optionally, the aforementioned storage medium may be a non-transitory computer-readable storage medium. For example, the non-transitory computer-readable storage medium may be ROM, random access memory (RAM), CD-ROM, magnetic tape, floppy disk, and optical data storage device, etc.

Additionally, another embodiment of the disclosure further provides a computer device, including a processor and a memory.

The memory is configured to store computer programs therein.

The processor is configured to execute the computer programs stored in the memory to implement a low-orbit satellite deorbit control method based on a particle swarm algorithm as described in the first embodiment, for example.

The aforementioned processor may be a general-purpose processor, including central processing unit (CPU), network processor (NP), etc.; it may also be digital signal processor (DSP), application specific integrated circuit (ASIC), field-programmable gate array (FPGA) or other programmable logic devices, discrete gates or transistor logic devices, discrete hardware components.

Accordingly, the above description is only considered as one embodiment of the disclosure, rather than limitation of the invention in any way. Although the invention has been described in the above with the preferred embodiments, the invention is not limited to those. Those skilled in the art, without departing from the scope of the invention, can make some equivalent changes or modifications using the content disclosed above, which will fall within the scope of the invention.

The invention claimed is:

1. A low-orbit satellite deorbit control method based on a particle swarm algorithm, comprising:
   constructing an objective function according to a position parameter and a perturbation acceleration of each of particles in a particle swarm as well as a preset Lagrangian multiplier and a preset penalty factor;

calculating an objective function value of each particle in the particle swarm based on the objective function, determining an objective fitness of each particle and a population fitness of the particle swarm according to a calculation result, updating the position parameter and velocity of each particle, and obtaining a population optimal fitness at a maximum number of iterations and the position parameters of particles corresponding to the population optimal fitness; and updating the Lagrangian multiplier and the penalty factor according to the population optimal fitness, obtaining a current number of iterations and an objective deviation value based on the population optimal fitness, comparing the current number of iterations and the objective deviation value with a preset iteration condition and a preset convergence condition, and determining an objective population fitness and an objective position parameter according to a comparison result to obtain an objective deorbit mode, wherein the step of constructing an objective function according to a position parameter and a perturbation acceleration of each of particles in a particle swarm as well as a preset Lagrangian multiplier and a preset penalty factor further comprises:

obtaining a rate of change of each orbital element over time under the thrust applied by a thruster, and determining a control rate containing current costate variables according to the rate of change;

calculating a thrust vector, a fuel consumption rate, and a perturbation acceleration of the thrust applied by the thruster;

determining a particle position vector according to the current costate variables, and using the particle position vector as the position parameter of each of the particles in the particle swarm; and performing orbit integration of the control rate based on the position parameter and the perturbation acceleration, and constructing the objective function according to a integration result, the preset Lagrangian multiplier and the preset penalty factor.

2. The method according to claim 1, wherein the steps of comparing the current number of iterations and the objective deviation value with a preset iteration condition and a preset convergence condition respectively and determining an objective population fitness and an objective position parameter according to a comparison result to obtain an objective deorbit mode further comprises:

if the current number of iterations meets the preset iteration condition and the objective deviation value meets the preset convergence condition, determining the population optimal fitness as the objective population fitness, and determining the position parameter corresponding to the objective population fitness as the objective position parameter;

if the current number of iterations does not meet the preset iteration condition or the objective deviation value does not meet the preset convergence condition, updating the objective function based on the updated Lagrangian multiplier and the updated penalty factor, and continuing to perform the step of performing orbit integration of the control rate based on the position parameter and the perturbation acceleration, and constructing the objective function according to a integration result, the preset Lagrangian multiplier and the preset penalty factor and subsequent steps, until the current number of iterations meets the preset iteration condition and the objective deviation value meets the preset convergence condition.

3. The method according to claim 1, wherein the step of determining a control rate containing current costate variables according to the rate of change further comprises:

based on the rate of change and the current costate variables, obtaining a Hamiltonian function by equation (7):

$$H = \lambda_a \frac{da}{dt} + \lambda_e \frac{de}{dt} + \lambda_i \frac{di}{dt}; \qquad (7)$$

where H is a Hamiltonian function value, $\lambda_a$, $\lambda_e$ and $\lambda_i$ and A are the current costate variables, a, e and i are semi-major axis, eccentricity and orbital inclination of an operational orbit respectively, and t is time;

deriving a preset angle corresponding to the thrust applied by the thruster according to the Hamilton function (7) to obtain the control rate containing the current costate variables.

4. The method according to claim 1, wherein in the step of calculating a thrust vector, a fuel consumption rate, and a perturbation acceleration of the thrust applied by the thruster, the thrust vector is obtained by equation (11), the fuel consumption rate is obtained by equation (12), and the perturbation acceleration is obtained by equation (14);

$$|\vec{F}_{thrust}| = \frac{2\eta P}{mgI_{sp}}; \qquad (11)$$

$$\frac{dm}{dt} = \frac{-2\eta P}{(gI_{sp})^2}; \qquad (12)$$

$$\begin{bmatrix} a_t \\ a_n \\ a_h \end{bmatrix} = \begin{bmatrix} \frac{pv}{h(1+e^2+2e\cos\theta)}(e\sin\theta * D + (1+e\cos\theta)*E) \\ -\frac{pv}{h(1+e^2+2e\cos\theta)}(-(1+e\cos\theta)*D + e\sin\theta *E) \end{bmatrix}; \qquad (14)$$

where $$\begin{cases} D = \begin{array}{l} -\frac{3}{2}\frac{GM_e}{r^2}\left(\frac{R_e}{r}\right)^2(1 - 3\sin^2 i \sin^2(\omega+\theta)) - \\ \frac{1}{2}K_D\rho v\sqrt{\frac{GM_e}{p}} e \sin\theta \end{array} \\ E = \begin{array}{l} -\frac{3}{2}\frac{GM_e}{r^2}\left(\frac{R_e}{r}\right)^2\sin^2 i \sin(2(\omega+\theta)) - \\ \frac{1}{2}K_D\rho v\left(\sqrt{\frac{GM_e}{p}}\frac{p}{r} - \sigma r \cos i\right) \end{array} \\ F = \begin{array}{l} -\frac{3}{2}\frac{GM_e}{r^2}\left(\frac{R_e}{r}\right)^2\sin 2i \sin(\omega+\theta) - \\ \frac{1}{2}K_D\rho v\sigma r \sin i \cos(\theta+\omega) \end{array} \end{cases} \qquad (13)$$

where n is small thruster efficiency, P is small thruster power, m is spacecraft mass, g is acceleration of gravity, $l_{sp}$ is small thruster specific impulse, $GM_e$ is gravitational coefficient of the earth, having a value of $3.986 \times 10^{14}$, $R_e$ is radius of the earth, having a size of 6378137m, $$K_D = C_D \frac{A}{m} \sqrt{k_r}, C_D, \frac{A}{m}$$

is the satellite drag coefficient and area-to-mass ratio, $$k_r = 1 - \frac{2\sigma h \cos i}{v^2}, \sigma = 7.292 \times 10^{-5}$$

is rotation velocity of the earth, ρ is atmospheric density at the altitude of the orbit on which the satellite is located, v is tangential velocity, r is radial distance, θ is true anomaly, ω is argument of perigee, i is orbital inclination.

5. The method according to claim 1, wherein in the step S1of performing orbit integration of the control rate based on the position parameter and the perturbation acceleration, and constructing the objective function according to a integration result, the preset Lagrangian multiplier and the preset penalty factor, the objective function J shown in equation (16) is constructed:

$$J = f(x_i^k) + \Sigma_{j=1}^{6} \lambda_j h_j(x_i^k) + \Sigma_{j=1}^{6} r_j [h_j(x_i^k)]^2 \quad (16);$$

where $h_j(x_i^k) = |\sigma_j - \sigma_j^*|$, $j=1, 2, \ldots, 6$ (17); $h_j(x_i^k)$ is an absolute value of the difference between the current orbital elements and the objective orbital elements generated by the control rate of a particle i in the k-th iteration, $\mu_j, r_j$ are the Lagrangian multiplier and the penalty factor respectively, $f(x_i^k)$ is deorbit duration generated by the control rate of the particle i in the k-th iteration, which is obtained by orbital integration of the control rate based on the position parameter and the perturbation acceleration.

6. The method according to claim 5, wherein in the process of orbit integration, if the orbit altitude increases and/or the eccentricity deviates from a threshold, the obtained integration result is deleted.

7. The method according to claim 1, wherein in the step of calculating an objective function value of each particle in the particle swarm based on the objective function, determining an objective fitness of each particle and a population fitness of the particle swarm according to a calculation result, updating the position parameter and velocity of each particle, and obtaining a population optimal fitness at a maximum number of iterations and the position parameters of particles corresponding to the population optimal fitness, the position parameter and the velocity of each particle are updated by equation (18):

$$\begin{cases} x_i^{k+1} = \omega v_i^k + p_g^k + \rho_k(1 - 2m_1) \\ v_i^{k+1} = -x_i^k + p_g^k + \omega v_i^k + \rho_k(1 - 2m_1) \end{cases} \quad (18);$$

where $$\begin{cases} \omega = \omega_{max} - \frac{\omega_{max} - \omega_{min}}{k_{max}^2} k^2 \\ \rho_{k+1} = \begin{cases} 2\rho_k & n_s > s \\ 0.5\rho_k & n_f > f \\ 2\rho_k & \text{other} \end{cases} \end{cases} \quad (19);$$

wherein the position and the velocity of a certain particle in the k-th iteration are $x_i^k$ and $v_i^k$ respectively, ω is inertia weight, $p_i^k$ is the best historical position of an individual in the past k iterations, $p_g^k$ is the best population historical position of the particle swarm after k iterations, $m_1$ is a random number between [0,1], $\rho_k$ is a random direction parameter, $n_s, n_f$ represents the relationship between current best population historical position $p_g^k$ and that of the previous iteration $p_g^{k-1}$, and if both are the same, $n_f$ is accumulated by one, otherwise $n_s$ is accumulated by one, s, f represent thresholds of $n_s, n_f$ respectively, $\omega_{max}$ is maximum value of inertia weight, $\omega_{min}$ is minimum value of inertia weight, $k_{max}$ is maximum number of iterations;

wherein in each previous iteration, an individual particle is compared with an individual historical value, and the particle swarm is compared with a population historical value, so that respective particle positions $p_i^k$ and $p_g^k$ corresponding to the minimum fitness are obtained.

8. The method according to claim 7, wherein in the step of performing orbit integration of the control rate based on the position parameter and the perturbation acceleration, and constructing the objective function according to a integration result, the preset Lagrangian multiplier and the preset penalty factor, the Lagrangian multiplier and the penalty factor are updated by equation (20):

$$\begin{cases} \lambda_j^{n+1} = \lambda_j^n + 2r_j^n h_j(x_{best}^n) \\ r_j^{n+1} = \begin{cases} 2r_j^n & h_j^2(x_{best}^n) > h_j^2(x_{best}^{n-1}) \wedge h_j^2(x_{best}^n) > \varepsilon_f \\ 0.5r_j^n & h_j^2(x_{best}^n) \leq \varepsilon_f \\ r_j^n & \text{other} \end{cases} \end{cases} \quad (20)$$

wherein value of $x_{best}$ is equal to the population optimal fitness $p_g^k$ obtained in step S2, $\varepsilon_f$ is a constraint threshold, $\lambda_j^n, r_j^n$ are the Lagrangian multiplier and the penalty factor respectively, where n is sequence number, $h_j(x_i^k)$ is an absolute value of the difference between the current orbital elements and the objective orbital elements generated by the control rate of a particle i in the k-th iteration.

9. The method according to claim 1, wherein the orbital elements comprise semi-major axis a, eccentricity e, orbital inclination i, right ascension of the ascending node Ω, argument of perigee ω and true anomaly θ.

10. The method according to claim 9, wherein the objective fitness and the population fitness are fitnesses corresponding to aminimum value of the objective function.

11. A non-transitory computer readable storage medium storing one or more readable programs adapted to cause a processor is executable by one or more processors to implement the steps of a low-orbit satellite deorbit control method based on a particle swarm algorithm according to claim 1.

12. A computer device comprising a memory configured to store computer programs thereon, and a processor configured to execute the computer programs stored on the memory to implement the steps of a low-orbit satellite deorbit control method based on a particle swarm algorithm according to claim 1.

* * * * *